United States Patent [19]

Thirion

[11] Patent Number: 4,606,905

[45] Date of Patent: Aug. 19, 1986

[54] CYCLIC PROCESS FOR HYDROGEN PEROXIDE PRODUCTION

[75] Inventor: Pierre Thirion, Sassenage, France

[73] Assignee: L'Air Liquide, Paris, France

[21] Appl. No.: 223,115

[22] Filed: Jan. 7, 1981

[30] Foreign Application Priority Data

Jan. 14, 1980 [FR] France ................................ 80 00707

[51] Int. Cl.$^4$ ............................................. C01B 15/02
[52] U.S. Cl. .................................... 423/588; 423/272
[58] Field of Search ........................ 423/272, 588, 589

[56] References Cited

U.S. PATENT DOCUMENTS

| | | |
|---|---|---|
| 2,537,516 | 1/1951 | Dawsey et al. . |
| 2,782,100 | 2/1957 | Greenspan ............................ 423/272 |
| 2,935,381 | 5/1960 | Darbee et al. . |
| 3,372,990 | 3/1968 | Charret ................................ 423/589 |
| 3,387,939 | 6/1968 | Reilly et al. ......................... 423/273 |
| 3,499,842 | 3/1970 | Carlson . |
| 3,742,061 | 6/1973 | Käbisch et al. . |
| 3,903,244 | 9/1975 | Winkley ............................... 423/272 |
| 4,070,442 | 1/1978 | Watts ................................... 423/584 |
| 4,304,762 | 12/1981 | Leigh .................................. 423/272 |

FOREIGN PATENT DOCUMENTS

| | | |
|---|---|---|
| 1405861 | 6/1965 | France . |
| 2061269 | 6/1971 | France . |
| 927617 | 5/1963 | United Kingdom . |

*Primary Examiner*—John Doll
*Assistant Examiner*—Wayne A. Langel
*Attorney, Agent, or Firm*—Browdy and Neimark

[57] ABSTRACT

A cyclic process for hydrogen peroxide production comprises a reduction of a quinone compound, followed by an oxidation into hydroperoxide, then finally a water extraction giving an aqueous hydrogen peroxide solution. An aqueous solution containing an organophosphonic acid, such as diethylene triamino pentamethylenephosphonic acid, and optionally associated with nitric acid or a nitrate is introduced during the oxidation and extraction phases to reduce the corrosion during the oxidation and extraction phases and improve the oxidation yield.

12 Claims, No Drawings

CYCLIC PROCESS FOR HYDROGEN PEROXIDE PRODUCTION

FIELD AND BACKGROUND OF INVENTION

This invention relates to a cyclic process of hydrogen peroxide production.

This cyclic process involves hydrogenating an organic solution containing quinone into hydroquinone, then oxidizing this hydroquinone into quinone hydroperoxide with oxygen or air, and then decomposing this hydroperoxide with water into an organic solution containing regenerated quinone. This latter solution is then reintroduced into a new cycle: hydrogenation, oxidation and extraction.

In practice, the organic solution of quinones, called a shuttle solution or working solution, circulates in a series of three apparatus: an hydrogenator, an oxidizer and a liquid-liquid extraction column. The constitutive material of these apparatus is generally aluminum, although stainless steel is sometimes used.

As in most syntheses performed in an organic medium, secondary reactions occur in addition to the main reaction. Here, then, the secondary reactions occur in each of the three phases of the process and the overall yield of the process is the product of the partial yields of each operation. In the two last phases, oxidation and extraction, the presence of peroxides and oxygen causes these secondary reactions to be essentially oxidation reactions of the constitutive elements of the working solution and of decomposition of the perioxides.

Also decomposition of the peroxides causes a more intense corrosion of the metal forming the reactor walls and in particular aluminum. This corrosion can also induce other secondary reactions. Thus, from the earliest times of the process, inhibitors of hydrogen peroxide decomposition and aluminum corrosion have been added to the extraction water. Inhibitors most currently used are sodium pyrophosphate as a stabilizer of the $H_2O_2$ decomposition and ammonium nitrate as a passivator of the aluminum.

In regard to the oxidizer, the apparent absence of an aqueous phase and the dessication due to the flow of hot air (40° to 60° C.) that travels through it, could lead to the belief that it is protected from corrosion and decomposition. Practice of the process shows that this is not the case; the presence of inorganic and organic salts, principally of sodium, causes a concentrated saline solution to deposit on its wall and causes a corrosion of the metal linked to the decomposition of the peroxides.

It is known, particularly from French Pat. No. 1,405,861, that addition of a hydrogen peroxide stabilizer and of a passivator in the oxidizer offers an advantage. According to this teaching, there is continuously introduced at a low delivery rate an aqueous solution containing sodium pyrophosphate and ammonium nitrate in the organic solution going into the oxidizer and also leaving the oxidizer to protect these accessory installations placed between the oxidizer and extractor.

Use of pyrophosphate, both in the oxidizer and extractor, therefore represented a very important improvement, the most remarkable feature of which was the elimination of alumina gel generated in the aqueous $H_2O_2$ solution, a gel causing the rapid clogging of the filtration barrier placed downstream from the extraction of this solution. With pyrophosphate in the solution, aluminum phosphate is generated in place of the aluminum gel and such gel is replaced on the filters by a granular deposit of the aluminum phosphate, and in much less abundant qualities as the corrosion is greatly reduced.

However, the pyrophosphate ion, $P_2O_7^{4-}$, has two major drawbacks:

1. It hydrolizes into orthophosphate ion, $PO_4^{3-}$, much less active than the pyrophosphate ion, an hydrolysis that is faster the more acid the medium.

2. The complex that is formed with the Al ion is very insoluble in the vicinity of pH2, and even less so the more the $H_2O_2$ concentration of the solution increases.

These drawbacks are not very apparent when the process is used with a relatively low productivity, i.e., when the concentration in "$H_2O_2$ equivalent" of the organic solution is from 5 to 9 g/liter.

Actually, $H_2O_2$ is intrinsically acid and its aqueous solutions have a pH that is lower the higher the concentration; as there is an $H_2O_2$ concentration equilibrium between the oxidized organic solutions and the aqueous solutions contained in the oxidizer and extractor, an increase in the $H_2O_2$ equivalent of the organic phase results in a reduction of the pH in the aqueous phase. For example, an $H_2O_2$ equivalent of 10 to 12 g/liter in organic solution is in concentration equilibrium with a 650–700 g/l aqueous solution whose pH can then only be below 3; this results in an accelerated hydrolysis of the pyrophosphate ion and because such ion must be kept in excess (by possible additions), the aluminum pyrophosphate can precipitate by the joint effect of the $H_2O_2$ concentration and the pH. In practice, this insolubility of the pyrophosphate-aluminum complex leads to the following drawbacks.

In the extraction column, and particularly at the foot of the column, where the hydrogen peroxide is most concentrated and the pH is minimum, adhering deposits of aluminum pyrophosphate are formed. These deposits are particularly present on the walls and glass peepholes where they impede visibility. These adhering deposits also appear on the perforated trays of the column, especially on the first plate, and in particular at the periphery of the perforations. The presence of these deposits reduces the delivery of the working solution, sooner or later causing stoppage of the installation and requiring cleaning of the trays and peepholes of the extraction column.

Downstream from the extractor there is noted the existence of adhering deposits of the pyrophosphate-aluminum complex on the vaporizers for concentrating hydrogen peroxide by distillation; and flocculates appear in the storage tanks of the concentrated hydrogen peroxide solutions. Also, upstream from the extraction phase, there is noted the appearance of adhering deposits on the walls of the oxidizer, and the exchangers and condensers placed between the oxidizer and extractor. These deposits are particularly damaging on aluminum, because, formed in the presence of a concentrated acid aqueous phase of $H_2O_2$ they provide sites for corrosion under the deposits, with the formation of cracks that often become deep and serious.

SUMMARY OF THE INVENTION

According to the present invention, a way has been discovered to mitigate the various drawbacks of sodium pyrophosphate. This invention involves an improvement in the cyclic process of hydrogen peroxide production, comprising a reduction of a quinone compound, followed by an oxidation into hydroperoxide, and then water extraction providing an aqueous hydrogen peroxide solution, wherein there is introduced into the working solution during the oxidation and extraction phases an aqueous solution of an organophosphonic acid.

Addition of an organophosphonic acid during the oxidation and extraction phases provides an extremely advantageous solution, particularly to the corrosion problems. For it has been found that the complexes of organophosphonic acids with aluminum in the working solution medium are significantly more soluble in the vicinity of pH 1 to 3 than aluminum pyrophosphate. Further, the organophosphonic acids have been found to be excellent stabilizers resisting hydrolysis and oxidation under the cyclic process conditions. Finally, which is very important, the organophosphonic acids exhibit a coefficient of separation between water and the solvents of the working solution so favorable to water than in practice it cannot be measured and can be considered as practically infinite.

DETAILED DESCRIPTION OF EMBODIMENTS

Of the organophosphonic acids making it possible to obtain the desired results in a very satisfactory manner, there can be chosen among others 1-hydroxyethane-1,1-disphosphonic acid; nitrilotrimethylene phosphonic acid; ethylene diamino tetramethylene phosphonic acid and diethylenetriaminopentamethylene phosphonic acid. In particular, it is advantageous to use aqueous solutions of diethylene triaminopentamethylene phosphonic acid. Each phosphonic acid can be used according to the invention alone or associated with another of such acids, so at the stages of the oxidation and extraction phase it is also possible to add an aqueous solution containing a mixture of ethylene diamino tetramethylenene tetramethylene and diethylene triamino pentamethylenephosphonic acids. The organophosphonic acids can be in free form or in sodium, potassium or ammonium salt form.

It has been found advantageous to introduce into the oxidation phase an aqueous solution containing an amount of organophosphonic acid that desirably is between 0.2 and 10 g/liter, and preferably between 0.5 and 2 g/liter. The amount of organophosphonic acid present in the aqueous solution added to the extraction phase is desirably between 100 and 500 mg/liter, and preferably between 150 and 250 mg/liter.

According to a variant of the invention, the aqueous treatment solution of the oxidation and extraction phases can contain an organophosphonic acid associated with nitric acid or an alkali or ammonium nitrate. It is advantageous that the amount of nitric acid or nitrate added to the aqueous solution of organophosphonic acid during the oxidation phase be between 2 and 50 g/liter, preferably between 5 and 20 g/liter. The amount of nitric acid or nitrate added to the aqueous solution of organophosphonic acid during the extraction phase is desirably between 100 and 500 mg/liter and preferably between 150 and 250 mg/liter.

Examples are given below that illustrate the invention in a nonlimiting way, showing the advantages brought by the introduction of organophosphonic acids in the oxidation and extraction phases.

EXAMPLE 1

Comparative study of the solubility of aluminum salts in hydrogen peroxide

Solubility tests were made by the following mode of operation: a certain amount of phosphonic acid was added to a pure aqueous $H_2O_2$ solution containg 16 mg/l of $Al^{+++}$ ion; the resulting solution was kept at 50° C. and stirred for 3 hours. The hot solution was filtered on a filter designated by the trademark "Millipore" of 1 micron openings; the aluminum in the filtrate was determined by emission spectrometry.

The results obtained with pyrophosphoric acid, orthophosphoric acid and diethylenetriamino-pentamethylenephosphonic acid (DTPP) and given in Table I.

TABLE I

| Acid | pH | 32% $H_2O_2$ by weight | 48% $H_2O_2$ by weight |
|---|---|---|---|
| Pyrophosphoric | | | |
| 58.6 mg/l | 4 | 16 mgAl/l | 16 mg Al/l |
| 58.6 mg/l | 2 | 3.6 mgAl/l | 2 mg Al/l |
| Orthophosphoric | | | |
| 64.5 mg/l | 4 | 16 mgAl/l | 16 mg Al/l |
| 64.5 mg/l | 2 | 16 mgAl/l | 16 mg Al/l |
| DTTP | | | |
| 200 mg/l | 4 | 16 mgAl/l | 16 mg Al/l |
| 200 mg/l | 2 | 16 mgAl/l | 12.5 mg Al/l |

In the cases where the solubility found corresponds to 16 mg Al/l, it should be understood that the real solubility of the Al salt is at least equal to 16 mg Al/liter. On the other hand, this table shows that in the 48% $H_2O_2$ solution at pH2, the DTPP complex is more than six times as soluble as the Al pyrophosphate.

EXAMPLE 2

Coefficient of separation of diethylene triaminopentamethylenephosphonic (DTPP) acid The coefficient of separation of DTPP between the aqueous phase and organic phase during the extraction stage was measured. At 25° C. there was put in equilibrium 1.1 volumes of water containing 125 mg/l of DTPP and 50 volumes of organic phase, the latter being made up of 50% mixture by weight of orthomethylcyclohexyl acetate and a cut of $C_9$ aromatic hydrocarbon (boiling range 165°–180° C.). After decanting, the DTPP was measured in the aqueous phase by polarography by the method known as the Metrom No. A76F method.

Regardless of the volumes of the two phases it was found that the DTPP concentration was practically constant in the aqueous phase. The coefficient of separation is consequently practically infinite in favor of water.

EXAMPLE 3

Separation rate and foam formation

It was found that addition of organophosphonic acid to the extraction water had no harmful secondary effect on the various phases of working the concentrated $H_2O_2$ solution. For doses on the order of 100 to 200 mg/l, no incidence of the organophosphonic acids on the rate of separation of the organic and aqueous phases after the liquid-liquid extraction column was noted. Also no foam formation was observed during vacuum distillation of a 70% $H_2O_2$ solution at 80° C. in a pyrex reflux distillation opposition.

On the basis of these data and encouraging preliminary checks, a test on a pilot scale was run on an apparatus making $H_2O_2$ simulating the industrial production cycle. The pilot apparatus, of "A 5" grade aluminum, was provided with a glass extraction column equipped with perforated "A 5" aluminum trays. A test program was run for 3 months during which the apparatus was operated continuously.

The tests were on comparative operating sequences with water extraction comprising various additives:
disodium pyrophosphate+$HNO_3$
DTPP+$HNO_3$
$NTP^1$+$HNO_3$
$HEDP^2$+$HNO_3$
$EDTP^3$+$HNO_3$

[1]NTP: nitrilo-trimethylene-phosphonic acid
[2]HEDP: 1-hydroxyethane-1,1-diphosphonic acid
[3]EDTP: ethylene-diamino-tetramethylene-phosphonic acid The running conditions of the pilot plant were kept constant to be able to make the results with different additives comparable; the pH of the extraction water was adjusted to pH 2.5 in all cases; hydrogenation was also constant and equal to 10 g/l of potential $H_2O_2$. Corrosion of the A 5 aluminum was indirectly followed by determination of the aluminum.

The results of these tests are given in Table II, the figures indicated represent the average of the results of daily checks.

TABLE II

| Pilot running condition | Period | $H_2O_2$ pH | $H_2O_2$ Acidity meq./l | $H_2O_2$ $Al^{+++}$ mg/l | Oxidation $R^t$ % |
|---|---|---|---|---|---|
| Extraction water | 35 days | 1.7 | 5.5 | 23 | 89.5 |
| $HNO_3$: 244 mg/l | | | | | |
| $Na_2H_2P_2O_7$: 30 mg/l | | | | | |
| pH: 2.5 | | | | | |
| Extraction water | 16 days | 1.7 | 6.0 | 1.2 | 89.5 |
| $HNO_3$: 197 mg/l | | | | | |
| DTPP: 20 mg/l | | | | | |
| pH: 2.5 | | | | | |
| Oxidizer water | 9 days | 1.8 | 4 | 1 | 94.5 |
| 2 × 100 ml/24 h | | | | | |
| $HNO_3$: 9.6 g/l | | | | | |
| DTPP: 1 g/l | | | | | |
| Extraction water | 10 days | 1.6 | 7.6 | 2.2 | 91.4 |
| $HNO_3$: 197 mg/l | | | | | |
| NTP: 20 mg/l | | | | | |
| pH: 2.5 | | | | | |
| Extraction water | 10 days | 1.6 | 7.0 | 5.5 | 89.7 |
| $HNO_3$: 197 mg/l | | | | | |
| HEDP: 20 mg/l | | | | | |
| pH: 2.5 | | | | | |
| Extraction water | 10 days | 1.7 | 5 | 1.75 | 88.6 |
| $HNO_3$: 197 mg/l | | | | | |
| EDTP: 20 mg/l | | | | | |
| pH: 2.5 | | | | | |

The results of Table II show that the organophosphonic acids reduce corrosion to a large extent in relation to disodium pyrophosphate. Of the four organophosphonic acids tested, the best results were obtained with DTPP.

During running of test 2 with DTPP, there was introduced in the oxidizer (Table II, test 2 bis) a stabilizing and passivating solution containing 1 g/l of DTPP and 9.6 g/l of $NO_3H$. Two additions of 100 ml of this solution were made at 24-hour intervals at the beginning of the test which lasted 9 days. Various checks made during this test 2 bis showed that the aqueous solution of $H_2O_2$ had a dissolved aluminum content equivalent to that of test 2 but, on the other hand, a notably improved average oxidation yield was observed, 94% compared with 89.5%. The oxidation yield is defined as the ratio of potential $H_2O_2$ contained in the working solution at the output of the oxidizer to the potential $H_2O_2$ contained in the working solution at the input of the oxidizer; this ratio is expressed in percent.

It will be obvious to those skilled in the art that various changes may be made without departing from the scope of the invention and the invention is not to be considered limited to what is described in the specification.

What is claimed is:

1. In a process for manufacturing hydrogen peroxide in an aluminum apparatus which comprises reducing a quinone compound, oxidizing the resulting hydroquinone compound, separating the hydrogen peroxide formed, and introducing into the organic working solution an aqueous solution of a stabilizer agent to stabilize the resultant reaction products within the oxidizer, the improvement wherein said stabilizing agent consists essentially of diethylene triamino pentamethylene phosphonic acid.

2. Cyclic process for producing hydrogen peroxide according to claim 1, wherein the aqueous solution contains an amount of diethylene triamino pentamethylene phosphonic acid betweein 0.2 and 10 g/liter and the amount thereof in the extraction stage is between 100 and 500 mg/liter of diethylene triamino pentamethylene phosphonic acid.

3. Cyclic process for producing hydrogen peroxide according to claim 1, wherein the aqueous solution in the oxidation stage contains between 0.5 and 2 g/liter of diethylene triamino pentamethylene phosphonic acid, and the aqueous solution in the extraction phase contains between 150 and 250 mg/liter of diethylene triamino pentamethylene phosphonic acid.

4. Cyclic process for producing hydrogen peroxide according to claim 1, wherein in the aqueous solution in the oxidation and extraction stages, the diethylene triamino pentamethylene phosphonic acid is associated with nitric acid or an alkali or ammonium nitrate.

5. Cyclic process for producing hydrogen peroxide according to claim 4, wherein the amount of nitric acid or nitrate added to the aqueous diethylene triamino pentamethylene phosphonic acid solution, introduced to the oxidation phase, is between 2 and 50 g/liter, and the amount of nitric acid or nitrate added to the aqueous diethylene triamino pentamethylene phosphonic acid solution, introduced to the extraction phase, is between 100 and 500 mg/liter.

6. Cyclic process for producing hydrogen peroxide according to claim 4, wherein the amount of nitric acid or nitrate added to the aqueous diethylene triamino pentamethylene phosphonic acid solution, introduced to the oxidation phase, is between 5 and 20 g/liter, and the amount of nitr2ic acid or nitrate added to the aqueous diethylene triamino pentamethylene phosphonic acid solution, introduced to the extraction phase, is between 150 and 250 mg/liter.

7. In a cyclic process for producing hydrogen peroxide comprising reduction of a quinone compound, followed by oxidation to hydroperoxide, then finally water extraction yielding an aqueous hydrogen peroxide solution, the improvement wherein an aqueous solution containing an organophosphonic acid consisting essentially of diethylene triamino pentamethylenephosphonic acid is introduced into the working solution during the oxidation and extraction stages, said aqueous solution introduced during the oxidation stage containing an amount of said organophosphonic acid between 0.2 and 10 g/liter and the aqueous solution introduced during the extraction stage contains 100–500 mg/liter of said organophosphonic acid.

8. Cyclic process for producing hydrogen peroxide according to claim 7, wherein the aqueous solution introduced during the oxidation stage contains between 0.5 and 2 g/liter of said organophosphonic acid and that introduced during the extraction stage contains between 150 and 250 mg/liter of said organophosphonic acid.

9. Cyclic process for producing hydrogen peroxide comprising reduction of a quinone compound, followed by oxidation to hydroperoxide, then finally a water extraction yielding an aqueous hydrogen peroxide solution, wherein an aqueous solution containing between 0.2 and 10 g/liter of diethylene triaminopentamethylenephosphonic acid is introduced in the working solution during the oxidation stage and an aqueous solution containing between 100 and 500 mg/liter of diethylene triaminopentamethylenephosphonic acid is introduced during the extraction stage.

10. Cyclic process for producing hydrogen peroxide according to claim 9, wherein the aqueous solution introduced during the oxidation stage contains between 0.5 and 2 g/liter of diethylene triaminopentamethylene phosphonic acid, and that introduced during the extraction stage contains between 150 and 250 m/liter of diethylene triaminopentamethylene phosphonic acid.

11. Cyclic process for producing hydrogen peroxide comprising a reduction of a quinone compound followed by an oxidation to hydroperoxide, then finally a water extraction yielding an aqueous hydrogen peroxide solution wherein an aqueous solution containing diethylenetriaminopentamethylenephosphonic acids together with ammonium nitrate is introduced in the working solution during the oxidation and extraction stages; the aqueous solution introduced during the oxidation stage containing an amount of said organophosphonic acid between 0.2 and 10 g/liter and between 2 and 50 g of ammonium nitrate, and the aqueous solution introduced during the extraction stage contains between 100 and 500 mg/liter of said organophosphonic acid and between 100 and 500 mg/liter of ammonium nitrate.

12. Cyclic process for producing hydrogen peroxide according to claim 11, wherein the aqueous solution introduced during the oxidation phase contains between 0.5 and 2 g/liter of said organophosphonic acid and 5 to 20 g/liter of ammonium nitrate, and that introduced during the extraction stage contains between 150 and 250 mg/liter of said organophosphonic acid and 150 to 250 mg/liter of ammonium nitrate.

* * * * *